US 8,946,648 B2

(12) United States Patent
Nelson

(10) Patent No.: US 8,946,648 B2
(45) Date of Patent: Feb. 3, 2015

(54) DUAL RANGE DIGITAL NUCLEAR SPECTROMETER

(75) Inventor: Greg Nelson, Ithaca, NY (US)

(73) Assignee: Princeton Gamma-Tech Instruments LLC, Waltham, MA (US)

(*) Notice: Subject to any disclaimer, the term of this patent is extended or adjusted under 35 U.S.C. 154(b) by 115 days.

(21) Appl. No.: 13/353,545

(22) Filed: Jan. 19, 2012

(65) Prior Publication Data
US 2013/0187052 A1 Jul. 25, 2013

(51) Int. Cl.
*G01T 1/36* (2006.01)

(52) U.S. Cl.
USPC ........................................................ 250/395

(58) Field of Classification Search
CPC .................................. G01T 1/36; G01T 3/001
USPC ........................................................ 250/395
See application file for complete search history.

(56) References Cited

U.S. PATENT DOCUMENTS

| | | | |
|---|---|---|---|
| 5,608,222 A | 3/1997 | Hardy et al. | |
| 6,242,741 B1 | 6/2001 | Miller et al. | |
| 6,327,549 B1 | 12/2001 | Bingham et al. | |
| 6,369,382 B1 | 4/2002 | Ito et al. | |
| 6,522,984 B1 | 2/2003 | Jordanov | |
| 6,590,206 B1 | 7/2003 | Evrard | |
| 6,590,957 B1 | 7/2003 | Warburton et al. | |
| 6,624,411 B2 | 9/2003 | Umemura | |
| 6,636,319 B1 | 10/2003 | Auth et al. | |
| 6,680,203 B2 | 1/2004 | Dasseux et al. | |
| 6,816,102 B2 | 11/2004 | Pavicic | |
| 6,822,223 B2 | 11/2004 | Davis | |
| 6,878,931 B1 | 4/2005 | Roushall et al. | |
| 6,984,820 B2 | 1/2006 | Davis | |
| 6,987,472 B2 | 1/2006 | Lin | |
| 7,123,176 B1 | 10/2006 | Jordanov | |
| 7,247,855 B2 | 7/2007 | Castallane et al. | |
| 7,498,964 B1 | 3/2009 | Beyerle | |
| 7,636,638 B2* | 12/2009 | Russ et al. | 702/22 |
| 8,173,953 B2 | 5/2012 | Stoller et al. | |
| 8,173,970 B2 | 5/2012 | Inbar | |
| 2002/0009177 A1* | 1/2002 | Takahashi | 378/49 |
| 2004/0054248 A1 | 3/2004 | Kimchy et al. | |
| 2006/0157655 A1* | 7/2006 | Mammone et al. | 250/395 |
| 2007/0114442 A1 | 5/2007 | Chen et al. | |
| 2008/0011962 A1* | 1/2008 | Russ | 250/395 |
| 2012/0153166 A1* | 6/2012 | Gueorguiev et al. | 250/362 |

OTHER PUBLICATIONS

Harms, "Automatic Dead-time Correction for Multichannel Pulse-Height Analyzers at Variable Counting Rates," Nuclear Instruments and Method, 53, 192-196, 1967.
Huang et al., "Automation of a Fourier Transform Ion Cyclotron Resonance Mass Spectrometer for Acquisition, Analysis, and E-mailing of High-Resolution Exact-Mass Electrospray Ionization Mass Spectral Data," Amer. Society for Mass Spectrometry, 1166-1173, 1999.
Knoll 1989: "Radiation Detection and Measurement," 2nd Ed. by Glenn F. Knoll (J. Wiley, NY, 1989), Chapter 16, Section III, "Pulse Shaping" pp. 564-582.
Xin Xianjie et al., "A New Sliding Principle and the Spectroscopic ADC Based on this Principle," Nuclear Instruments and methods in Physics Research, A259, 521-524, 1987.

* cited by examiner

*Primary Examiner* — Constantine Hannaher
(74) *Attorney, Agent, or Firm* — Gordon Stewart

(57) ABSTRACT

A spectrometer (100) for detecting a source of radioactive emissions having a detector (120) that produces a detector signal (20), with an amplifier (30) followed by a single digitizer (40) followed by a digital signal processing unit (50), within which the signal processing implements two distinct pathways (51, 52), and associated firmware to utilize the two resulting sets of processed data in nuclear isotope identification.

30 Claims, 8 Drawing Sheets

SIGNAL PROCESSING PATH

DUAL RANGE DIGITAL NUCLEAR SPECTROMETER

FIELD OF THE INVENTION

The invention relates generally to spectrometers and, more particularly, to a spectroscopic apparatus that digitizes an analog signal of widely varying range, and then applies digital signal processing techniques to derive two digital datastreams with different characteristics which enhance the subsequent processing for isotope identification. More specifically, the present invention relates to the use of these spectrometers for the detection of radioactive materials potentially used in terrorist or other surreptitious activity.

BACKGROUND OF THE INVENTION

Spectroscopy is the science of measuring radiation with a range of frequencies or wavelengths, and recording results which represent this range of frequencies or wavelengths as a spectrum. Spectroscopy can involve different ranges of radiation including microwaves, visible and invisible light, X-rays, or gamma rays, infrared radiation, ultraviolet radiation as well as other types of signals. In nuclear spectroscopy, the X-rays and gamma rays are frequently used to identify the presence of specific radioactive materials; this information is useful in determining both the type (natural, benign, threatening) and quantity (safe level, level of concern, health threat) of the material present.

Spectroscopy then, identifies a sample's relative degree of emission, transmission, absorption, or reflection over a range of radiation frequencies. For example, ordinary light is a radiation that is visible to the naked eye as it is reflected off of objects. Spectroscopy, however, often involves other ranges of radiation. Chemists often use mid-infrared radiation to determine the molecular content of a "sample" because different molecules absorb different amounts of the frequencies contained in such radiation. Each molecular species has a spectral "fingerprint" in the mid-infrared range. An instrument known as a spectrometer enables spectroscopic analysis. Earlier "wavelength dispersive" spectrometers rotated a dispersing element (grating or prism) through an arc so that all wavelengths within a desired range are presented to a detector. The industry subsequently developed spectrometers that use an interferometer to create a composite signal called an interferogram—a signal containing all frequencies in the entire spectrum—and then analyze the magnitude of each particular frequencies in that composite signal using the relatively complicated but well known mathematics of the Fourier Transform (FT). Such interferometer-based spectrometers are often called Fourier Transform Infrared spectrometers, or simply FTIR spectrometers.

Conventional gamma ray spectroscopy systems are comprised of a high voltage source that provides power to a means for detecting gamma rays emitted from a particular source of interest. A gamma ray emitted from a source of nuclear decay is converted by the detector into an electrical analog pulse signal connected thereto. The analog pulse signal is typically amplified in a preamplifier and subsequently shaped in a shaping amplifier and stretched in a pulse stretcher. After the analog pulse signal is amplified, shaped, and stretched, it is converted into a digital signal by an analog to digital converter. The analog to digital converter (ADC) outputs an n-bit digital signal (e.g., a 12-bit digital signal) representing the energy of the detected gamma ray, which is then counted in a binning scheme to produce a histogram, i.e. an energy spectrum of the incoming gamma rays.

A more recent development, enabled by the development of high-speed and high-performance analog-to-digital converters, is the digital spectrometer, which changes this order: the analog pulse signal is typically amplified in a preamplifier, and then immediately digitized by an ADC. Then, a signal processing step is performed which combines amplification, shaping, and stretching, which is performed in the digital domain by multiplying, summing, or applying other mathematical transforms to the digital signal produced by the ADC. The result is still a digital signal which is counted in a binning scheme to produce histogram.

The entire instrument enabling this analysis is known as the spectrometer. FIG. 1 shows a typical spectrometer (100) as applied to nuclear measurements. The device shown includes a detector (120), which may be a scintillator, a solid-state detector, or another comparable measurement device. The signal 20 from this detector typically goes through an amplifier (30) before being sent to a suitable analog-to-digital converter (40). In a digital nuclear spectrometer, very little processing is done before the analog-to-digital converter, because the important signal-processing is implemented in a digital signal processor (50). The data coming from the digital signal processor is then delivered to a processor (60) which stores the collected histogram (or "spectrum") in memory (70). It may further implement analysis firmware (61) which converts the spectrum into a set of analysis results (65). (Firmware here is taken to mean software that is implemented on a special-purpose computing hardware, rather than on a conventional personal computer or server.) These results are then sent to an output device (110) which may be local (a display) or remote (a computer or database).

One of the critical factors in nuclear spectroscopy is resolution; better resolution, which corresponds to lower noise, improves the success of the later analysis. Some factors that determine resolution are outside the control of the spectrometer, such as intrinsic detector properties. However, the spectrometer can implement a low or high resolution in the spectrum it stores, which is usually described in channels. Nuclear spectrometers with as few as 256 channels and as many as 16384 channels are common; while a larger number of channels improves the accuracy of analysis, it also increases the cost of the system and often makes processing slower. As a result, systems are often designed to use the smallest number of channels required for the application.

Detectors used for detecting gamma rays in nuclear spectroscopy systems include: Geiger-Muller tubes, sodium iodide scintillation detectors, plastic scintillators, silicon (lithium) detectors, gas flow proportional counters, germanium (lithium) detectors and hyper-pure germanium detectors. Geiger-Muller tubes are very inexpensive but have essentially no energy resolution. That is, an analog pulse signal from a Geiger-Muller tube does not differentiate between incoming gamma rays according to energy. In contrast, hyper-pure germanium detectors have excellent resolution and are extremely linear in terms of energy over a wide variety of energies. However, hyper-pure germanium detectors can cost tens of thousands of dollars, require liquid nitrogen for cryogenic cooling, and are quite large.

Sodium iodide scintillation detectors, and many other scintillation-type detectors, have reasonable energy resolution, are rugged, do not require cryogenic cooling, are physically small and have a reasonably low cost. Sodium iodide detectors are therefore desirable for use in many applications in medicine, radiation surveying, waste monitoring, and education. Unfortunately, sodium iodide detectors suffer from a variety of problems. Some designs, such as the one set forth in U.S. Pat. No. 5,608,222 to Hardy et al, teaches a device that optimizes these channels to match the resolution of other components.

The '222 patent discloses and claims an analog to digital conversion technique for spectroscopy that enables the use of detectors in which resolution varies as a function of energy. The device further comprises an analog to digital converter with relatively poor differential linearity without sacrificing the ability to determine the locations and magnitude of peaks within a spectrum. A transfer function that characterizes the dependence of the resolution of the system is used to convert data before the data is displayed in a histogram. The transfer function can also characterize repeatable non-linearities in the system and may be used for gamma ray spectroscopy with sodium iodide detectors. The transform function can be implemented in a digital circuit, an analog circuit, or in a firmware or software transform table.

U.S. Pat. No. 7,498,964 to Beyerle discloses an approach to spectroscopy that facilitates the transfer of signals between both analog and digital spectrometers and their sub-components. Although the data stream in this approach is converted between different forms throughout the disclosed system, there is only a single data stream, representing and resulting in a single histogram.

U.S. Pat. No. 7,247,855 to Castellane et. al. discloses a portable nuclear material detector generally includes a scintillating fiber radiation sensor, a light detector, a conditioning circuit, a frequency shift keying (FSK) circuit, a fast Fourier transform (FFT) circuit, an electronic controller, an amplitude spectral addition circuit, and an output device. A high voltage direct current (HVDC) source is provided to excite the light detector, while a separate power supply may be provided to power the remaining components. Portability is facilitated by locating the components of the detector within a handheld-sized housing. When bombarded by gamma particles, the radiation sensor emits light, which is detected by the light detector and converted into electrical signals. These electrical signals are then conditioned and converted to spectral lines. The frequency of a give spectral line is associated with a particular radioactive isotope, while the cumulative amplitude of all spectral lines having a common frequency is indicative of the strength and location of the isotope. All or part of this information (identity, strength, direction, and distance) may be provided on the output device.

U.S. Pat. No. 6,327,549 to Bingham et al. discloses and claims a differential correction apparatus for use with a spectroscopy device. The spectroscopy device simultaneously produces two histograms corresponding to the spectrum acquired. The first histogram contains the counts recorded by a differential correction method (DCM), giving the best estimate of the counts per channel in the absence of dead time. The second histogram is the error spectrum, giving the variance of the counts in each channel of the first spectrum. The two spectra have the same size, true acquisition time, and energy calibration with the only difference being the number of counts in each channel. By obtaining both histograms, it is asserted to be possible to both obtain an accurate spectrum when the energy peaks have varying decay times and retain the necessary information about the spectrum to allow the statistical error to be calculated. However, in some applications, good resolution is critical for one part of the incoming spectral signal, but not needed for another portion of the signal. In these circumstances, a modified design which provides both types of data would provide the best of both worlds.

U.S. Pat. No. 6,636,619 to Auth et al. teaches a spectrometer having an interferometer, a detector that produces a detector signal, and a dual-digitizer system including two analog-to-digital converters that simultaneously digitize low-gain and high-gain versions of the detector signal, and suitable data structures and associated firmware for merging the two resulting sets of digitized data into a single, high dynamic range set of data. The analog detector signal has a high gain circuit to produce a high gain analog signal. This is then digitized to a low gain analog signal using a first ADC converter to produce a set of low gain samples. The high gain analog signal is processed by a second ADC converter to produce a set of high gain samples, some of the high gain samples being below a pre-determined threshold and some of the high gain samples being above the predetermined threshold. The in-range high gain samples are merged with the low gain samples to produce a combined set of samples by identifying a plurality of pairs of low-gain and high-gain samples where the high-gain samples are below the predetermined threshold; normalizing the high-gain samples relative to the low-gain samples; and assembling a combined set of low-gain sample and high-gain samples. However, this implementation relies on two sets of analog signal processing hardware and ADC components, which makes it complex, expensive, and inflexible. A modified design which implements differences in processing digitally would address these limitations.

SUMMARY OF THE INVENTION

A the present invention comprises a nuclear spectrometer that processes a signal produced from a gamma ray source received by an analog detector that that produces a signal corresponding to the source gamma ray; an amplifier; amplifies the signal which passes the signal to an analog-to-digital converter to produce a set of digital samples. The digital samples are processed through two signal-processing algorithms which simultaneously store the results in two distinct spectra, a novel digital design, implementing a second pathway in the signal processing step. Firmware merges the two distinct spectra in analytical processing to characterize the gamma ray source signal. The computation of two different analytical results within the signal processing block is what is novel. The digital design comprising the additional logic and pathway in the signal processing block is unique.

DETAILED DESCRIPTION OF THE INVENTION

As applied to a nuclear spectroscopy system, the invention involves sensing gamma rays, beta particles, alpha particles, and/or neutrons, and generating a digitized value for each ray or particle detected. The signals are then processed through multiple digital signal processing pathways to make multiple measurements from the single event. The preferred signal processing optimizes for two different properties in two pathways, such as high resolution in one pathway and large range in another. These measurements are then provided for analysis where the high resolution signal is used for one part of the analysis, and the large range for another.

The present invention comprises a way to compute multiple results using digital signal processing hardware, in place of implementing multiple analog signal processing pathways. Although the same result could be implemented with multiple analog pathways (as seen in U.S. Pat. No. 6,636,319), the present invention produces a more flexible, physically smaller, and less costly implementation because of the use of digital signal processing. These advantages of digital signal processing have been recognized in other designs, but are enhanced when multiple results must be computed.

In a second embodiment of the present invention, the invention may be regarded as a way to compute multiple results that improve the analytical capabilities of a nuclear spectroscopy system. Other types of results may be computed which differ in manners other than gain (whereas gain is the only distinction drawn in U.S. Pat. No. 6,636,319). Certain analyses require both good resolution and the ability to interpret a large energy range. With only a single signal processing result, a trade-off must be made between these two features. With the invention claimed herein, no trade-off is required because both measurements are made simultaneously. As another example, some analyses require both good resolution and high throughput; resolution typically becomes worse as filtering is adjusted for higher throughput. With this invention, both high-resolution and high-throughput results can be calculated simultaneously.

Figure 1:
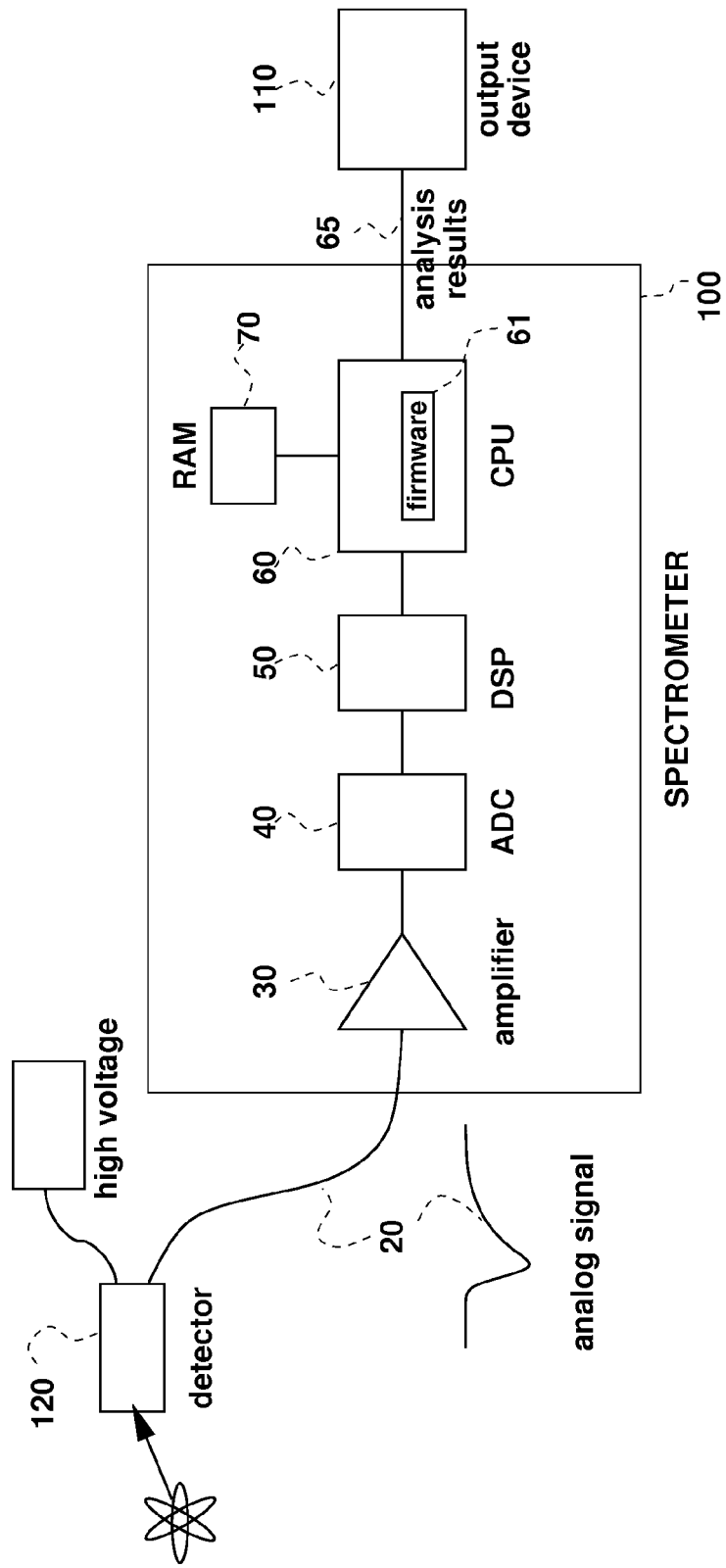
FIG. 1 is a schematic block diagram of a prior art nuclear spectroscopy system.

Referring now to FIG. 1, a typical spectrometer 100 known in the art is shown as applied to nuclear measurements. The device includes a detector (120), which may be a scintillator, a solid-state detector, or another comparable measurement device. The signal 20 from this detector typically goes through an amplifier (30) before being sent to a suitable analog-to-digital converter 40. In a digital spectrometer, very little processing is done before the analog-to-digital converter, because the important signal-processing is implemented in a digital signal processor DSP, 50. The data coming from the digital signal processor is then delivered to a processor 60 which stores the collected spectrum in memory 70. It may further implement analysis firmware 61 which converts the spectrum into a set of analysis results 65. These results are then sent to an output device 110 which may be local (a display) or remote (a computer or database).

Figure 2:
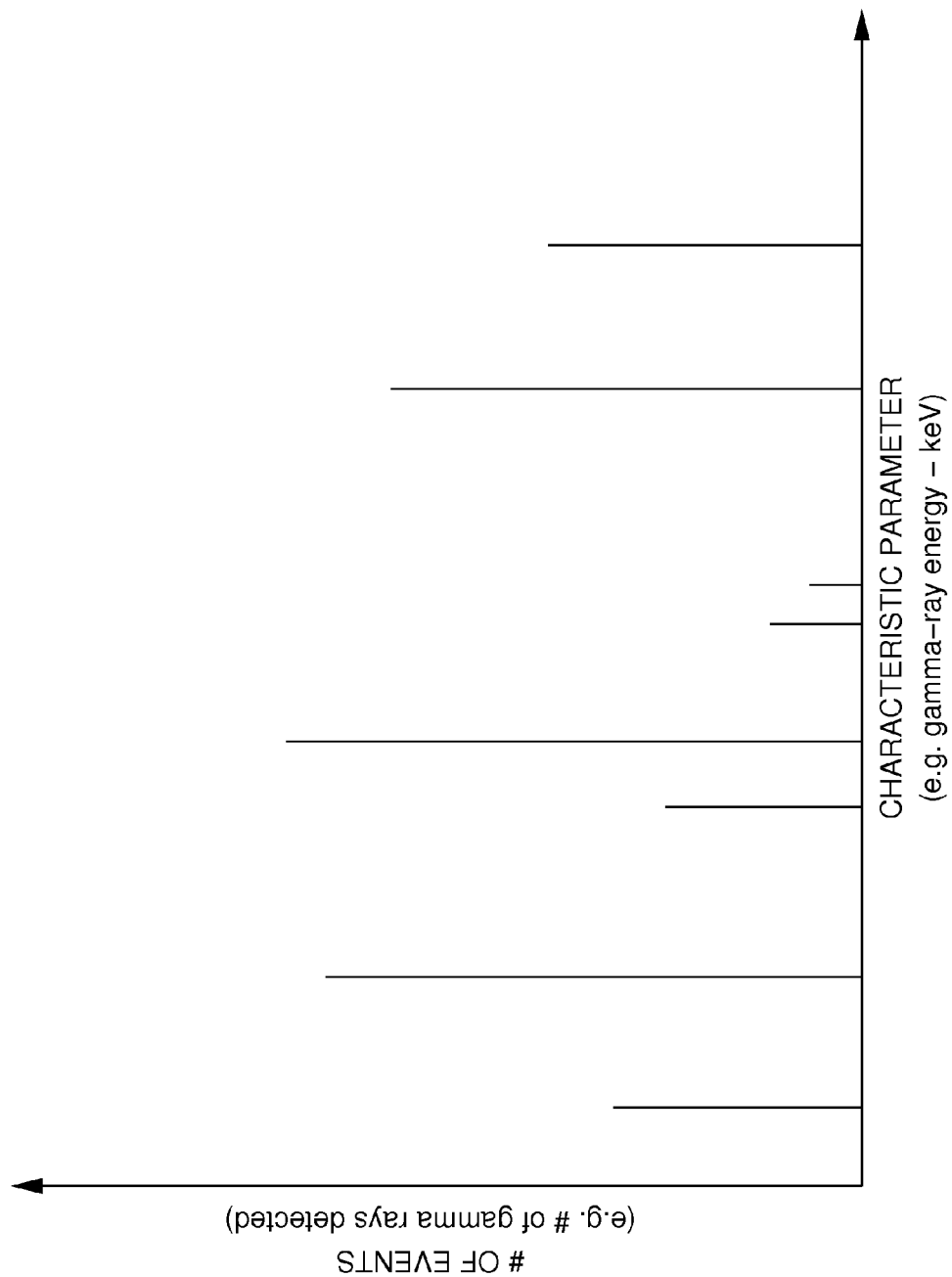
FIG. 2 is an idealized histogram that would be generated by an ideal nuclear spectroscopy system measuring gamma rays.

Referring now to FIG. 2, an example of a spectrograph that is generated from a radioactive source measured by a spectrometer known in the art is shown whereby the degree or amount of gamma ($\delta$) ray energy (keV) is plotted against the number of events (times) that the energy was emitted from the radioactive source. In this manner, the type of radioactive source present as well as some sense of the quantity can be determined, which can be used to assess the danger of what has been found.

The spectra generated by the device of the present invention are used to identify the isotopes that are present in a particular radioactive source using their characteristic emissions. The spectrometer processes the signals generated and detected by creating one or more spectra. Each spectrum is analyzed using a library of isotopes specifically adapted to the resolution of the spectrum, and suitable firmware for matching the spectrum to this library. The library itself consists of specific descriptions of isotopes in terms of their spectral line energies and intensities. The library consists of template spectra created from one or more isotopes, and the matching process is done by matching the templates, singly or in combination, to the overall spectrum generated by the scintillation detector, the ADC, the FPGA, etc.

Figure 3:
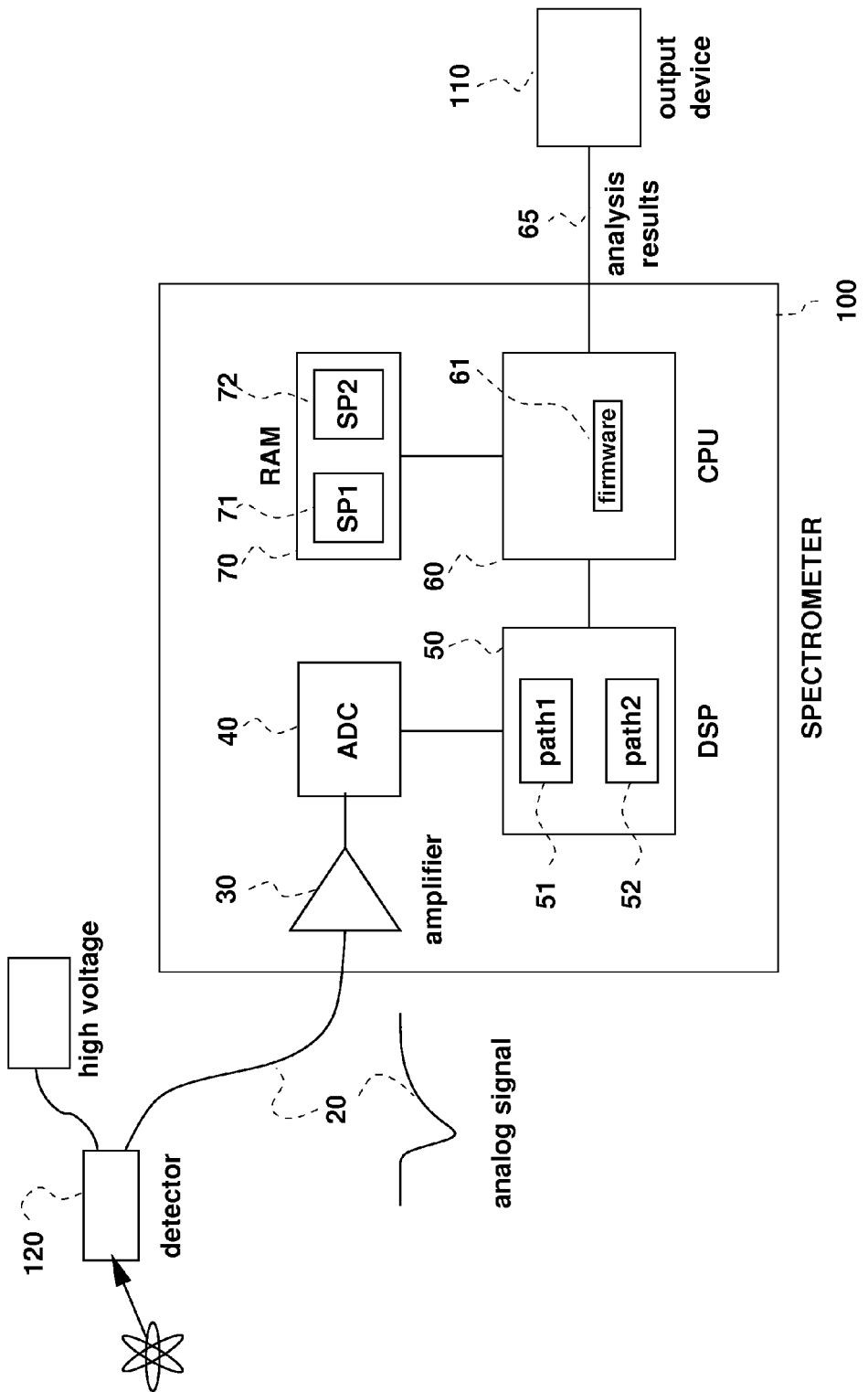
FIG. 3 is a block diagram of a digital circuit embodiment of a nuclear spectroscopy system with dual signal processing pathways in accordance with the invention.

Referring now to FIG. 3, a nuclear spectrometer is shown in accordance with the preferred embodiment of the present invention, which accomplishes the signal processing using a field-programmable gate array. FIG. 3 shows a detector (120) as is known in the art which is preferably a scintillator detector for initially receiving the gamma rays from the radioactive source comprised of a crystal selected from the group comprised of sodium iodide (NaI), cesium iodide (CsI), lanthanum chloride ($LaCl_3$), lanthanum bromide ($LaBr_3$), or cerium bromide ($CeBr_3$), with appropriate dopants including Tl, or another suitable scintillation material. The detector may also be accompanied by a moderator material that improves the neutron capture cross-section by thermalizing fast neutrons, or a "gamma re-emission" substance which enhances the high-energy prompt gamma response to neutron capture. Suitable moderator and gamma re-emission materials useful in the practice of the present invention include chemicals, alloys, or compounds with components selected from the group comprising the elements boron (B), lithium (Li), chlorine (Cl), manganese (Mn), iron (Fe), and nitrogen (N).

The detector produces an analog detector signal corresponding to the source gamma ray which is then transmitted to a standard amplifier (30) for processing the analog detector signal. The amplifier is typically an operational amplifier with a bandwidth limit appropriate for subsequent digitization. Scintillators useful in the device and practice of the present invention are made by companies like Saint-Gobain Ceramics and Plastics Inc., Paris France, and Amcrys, Kharkov, Ukraine. Suitable amplifier devices useful in the practice of the present invention are commercially available from Analog Devices Inc., Norwood, Mass., (Model Nos. AD743; OP27) or Linear Technologies Inc., Milpitas, Calif. (Model Nos., LT1885, LT6233/4/5).

The analog signal is then transmitted to the analog-to-digital converter (ADC, 40) which converts a continuous quantity to a discrete time digital representation. The ADC converts an input analog voltage or current to a digital number proportional to the magnitude of the voltage or current. The first step is usually to convert the signal from an analog to a digital form, by sampling and then digitizing it which turns the analog signal into a stream of numbers. The digital output may use different coding schemes. Typically the digital output will be a two's complement binary number that is proportional to the input, but there are other possibilities. An encoder, for example, might output a Gray code. Suitable analog-to-digital converters useful in the practice of the present invention are commercially available from Analog Devices Inc., Norwood, Mass., (Model No. AD9245) or Linear Technologies Inc., Milpitas, Calif. (Model No. LTC2248).

The resolution of the converter indicates the number of discrete values it can produce over the range of analog values. The values are usually stored electronically in binary form, so the resolution is usually expressed in bits. In consequence, the number of discrete values available, or "levels", is a power of two. For example, an ADC with a resolution of 8 bits can encode an analog input to one in 256 different levels, since $2^8=256$. The values can represent the ranges from 0 to 255 (i.e. unsigned integer) or from −128 to 127 (i.e. signed integer), depending on the application.

Resolution can also be defined electrically, and expressed in volts. The minimum change in voltage required to guarantee a change in the output code level is called the least significant bit (LSB) voltage. The resolution Q of the ADC is equal to the LSB voltage. The voltage resolution of an ADC is equal to its overall voltage measurement range divided by the number of discrete voltage intervals $$Q = \frac{E_{FSR}}{N},$$

where N is the number of voltage intervals and $E_{FSR}$ is the full scale voltage range. $E_{FSR}$ is given by $$E_{FSR} = V_{RefHi} - V_{RefLow},$$

where $V_{RefHi}$ and $V_{RefLow}$ are the upper and lower extremes, respectively, of the voltages that can be coded.

Normally, the number of voltage intervals is given by $$N=2^M,$$

where M is the ADC's resolution in bits.

That is, one voltage interval is assigned per code level.

In practice, the useful resolution of a converter is limited by the best signal-to-noise ratio (SNR) that can be achieved for a digitized signal. An ADC can resolve a signal to only a certain number of bits of resolution, called the effective number of bits (ENOB). One effective bit of resolution changes the signal-to-noise ratio of the digitized signal by 6 dB, if the resolution is limited by the ADC. If a preamplifier has been used prior to A/D conversion, the noise introduced by the amplifier can be an important contributing factor towards the overall SNR.

Beginning with the signals produced by the ADC, the goal of digital signal processing (DSP) is usually to measure, filter and/or compress continuous real-world analog signals. DSP algorithms have long been run on standard computers; later, on specialized commercial digital signal processor (CDSP) or digital signal controller (DSC) components; and now also on purpose-built hardware including application-specific integrated circuits (ASICs). Today, an additional technology used for digital signal processing is the field-programmable gate array (FPGA).

Referring again now to FIG. 3, the analog signal is then passed to an analog-to-digital converter (ADC 40) which supplies digital measurements to digital signal processing block (50). In the preferred embodiment of the present invention, this signal processing block is implemented as a field-programmable gate array. However, the scope of the current invention also conceives of an implementation using a commercial digital signal processor (CDSP) or a custom-fabricated application-specific integrated circuit (ASIC). The present invention prefers the FPGA because of the increased flexibility for implementing a wide range of signal processing algorithms. Typical commercially available FPGAs include products from Xilinx, Inc., San Jose, Calif. (Model Nos. XC3S100, XC4VFX12, & XC6VLX75), and Altera Inc., San Jose, Calif. (Model No. EP3C5U25617N). CDSP implementations could be based on components commercially available from Analog Devices Inc., Norwood, Mass., (Model No. ADSP-21479), or Texas Instruments, Dallas, Tex., (Model No. TMS320C674x)

Figure 4:
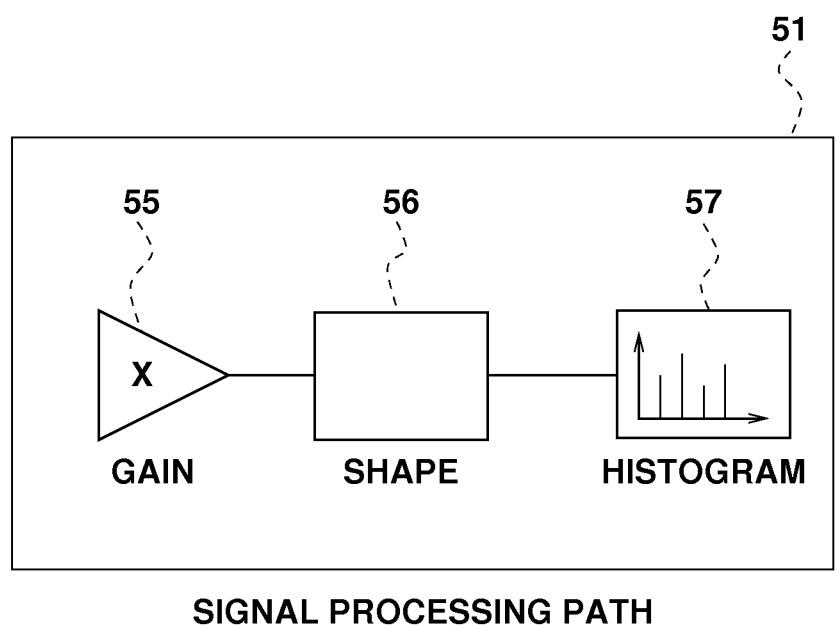
FIG. 4 is a block diagram representing the principal steps of a signal processing pathway.

Within the FPGA, two distinct signal processing paths (51, 52) are implemented. In other words, the digital samples are processed through two signal-processing algorithms simultaneously using within a single integrated circuit (IC) package that incorporates both algorithms as described below. The processed results are then transferred as shown in FIG. 3 to the central processing unit (CPU 60), where they are stored in random access memory (RAM 70) as two distinct spectra (71, 72). Each signal processing path performs several steps as shown in FIG. 4 including gain (55), shaping 56 (with a particular time constant), and binning (57).

Figure 5:
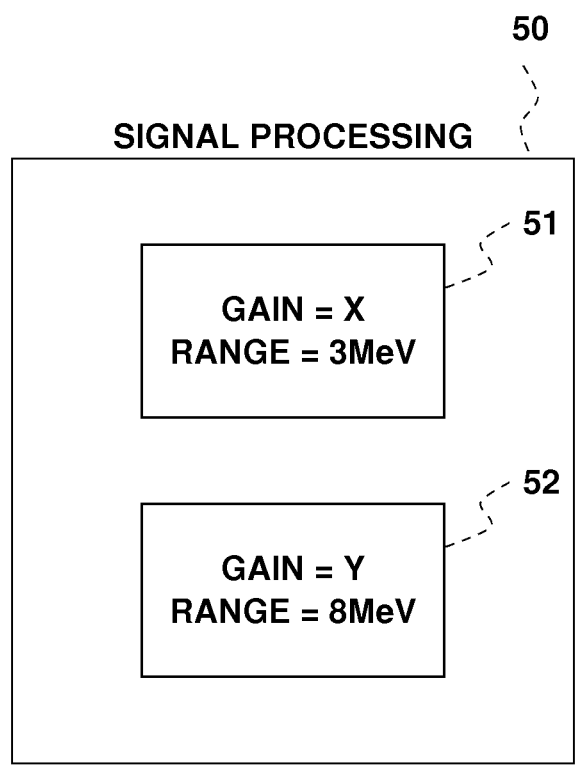
FIG. 5 is a schematic block diagram of a dual path signal processing block in accordance with the invention that is preferably used for detecting low and high energy gammas simultaneously.

Many possible differences may be implemented between the two paths. The signal processing paths 51 and 52 are preferably different from one another in gain and full scale energy, as shown in FIG. 5. With the full scale energies shown here, a 3 MeV range is appropriate for typical gamma spectroscopy, which may include energies as low as 18 keV or as high as 2615 keV. Expanding the range more than this requires an ever increasing number of histogram channels in order to effectively resolve the energies of closely-spaced gamma lines, and this results in larger data buses, memory sizes, and processing times. The separate 8 MeV range may be collected with a much smaller number of channels, because the additional high-energy gammas are used only to characterize neutron activation products such as the 4.44 MeV gamma from $^{10}B+n \rightarrow {}^{11}B$, the 5.27 MeV gamma from $^{14}N+n \rightarrow {}^{15}N$, etc. These events may be counted without attempting to resolve them to very precise energies.

Figure 6:
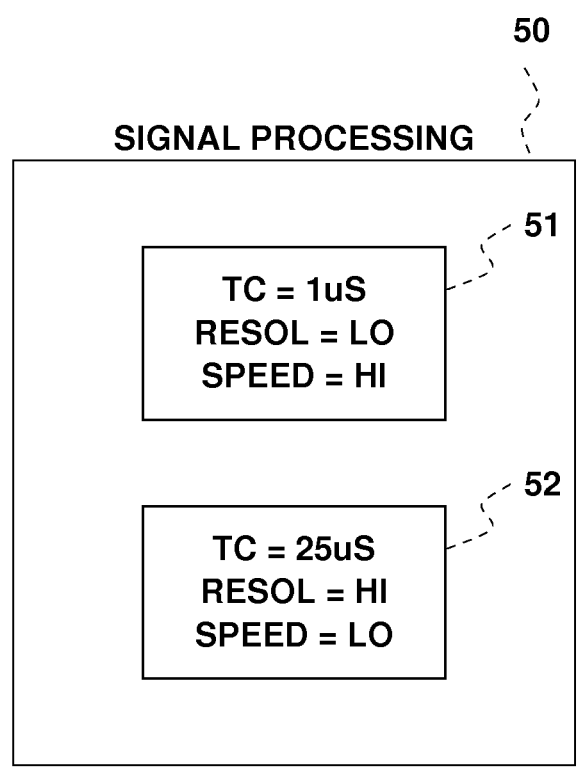
FIG. 6 is a block diagram of a dual path signal processing block in accordance with the invention that is preferably used for detecting high-resolution and high-throughput gamma simultaneously.

Alternately, the two paths may be different from one another in shaping time, resolution, and speed as shown in FIG. 6. This mechanism makes it possible to collect two spectra, one which contains the most accurate count rates (because with a short shaping time constant, the dead time is much lower) and one which has improved energy resolution. In the final analysis, the high-resolution spectrum could be used to identify the radioisotopes present, and then with this determination made, the high-count-rate spectrum could be used to more accurately estimate the quantities of the radioactive materials present.

Figure 7:
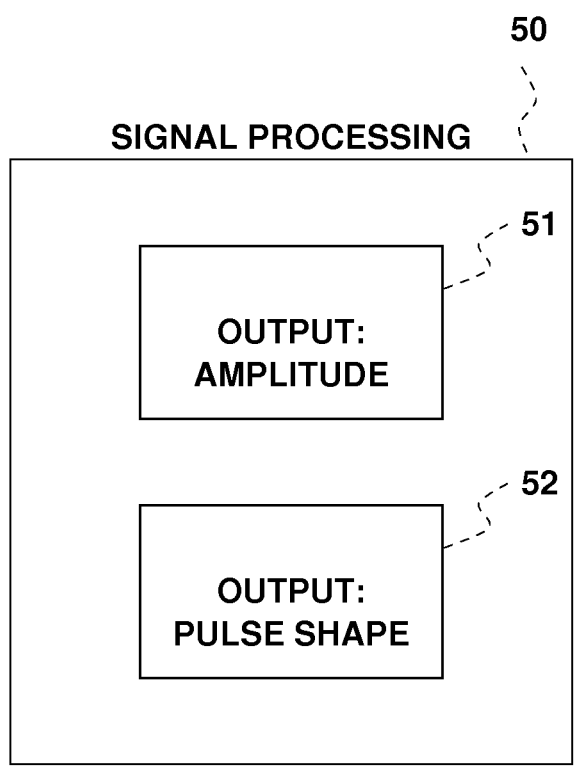
FIG. 7 is a schematic diagram of a dual path signal processing block in accordance with the invention that is preferably used for measuring both amplitude and shape of the input signal simultaneously.

In another embodiment of the present invention, the two paths are used to compute distinct properties of the signal, as shown in FIG. 7. In this case, one path is used to compute the amplitude of the pulse, while the other is used to compute the pulse shape. In a typical application, the pulse shape could discriminate different kinds of interactions in the detector, including differences in charge collection that reflect depth-of-interaction; or it could discriminate interactions in different detectors (such as decay-time differences in NaI(TI) and LiI(Eu) scintillators). The histogram of these interactions may be of interest directly (characterizing the distribution of depth of interaction independent of the energies), or the correlated pairs from the two signal processing pathways might be processed further to create multiple histograms that each represent energy, using a criterion drawn from the other signal processing path to determine which histogram the event is stored in (such as one histogram for fast NaI(TI) events and another for slower LiI(Eu) events). Alternately, a single multivariate histogram (X and Y representing the independent measured variables, Z representing count events) could be created.

Regardless of the implementation of the signal processing, each pathway computes a distinct measurement. These may be used to create the distinct spectra 71, 72 as shown in FIG. 3, or combined before the creation of the histogram as described in the previous paragraph. The invention is not limited to these three embodiments of the dual signal processing paths, as other functions may be computed by a signal processing unit.

Many variations are possible as to what components may reside in the spectrometer. In particular, the invention is not limited to the use of an FPGA (50) for signal processing; a general purpose CDSP integrated circuit, a general-purpose processor integrated circuit, a custom-fabricated application-specific integrated circuit (ASIC), or another type of digital processing hardware or firmware may be used in the place of the FPGA.

Figure 8:
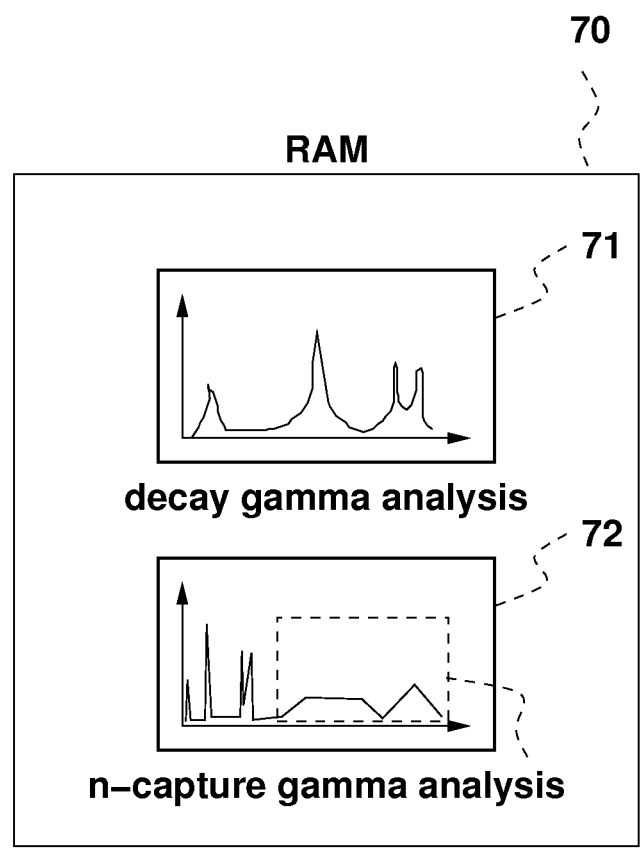
FIG. 8 discloses an algorithm which uses the two result spectra 71 and 72, representing different full-scale energies, to compute both decay-gamma and neutron-capture gamma count rates.

Many variations are possible as to how the collected spectra 71 and 72 of FIG. 3 may be analyzed. As one example, FIG. 8 shows a technique where the high-gain spectrum 71 is used for conventional isotopic analysis in the 0-3 MeV range as required by many standards, while the low-gain spectrum 72 is used to detect neutron-capture gammas that indicate the presence of fissile or neutron-producing materials ($^{239}$Pu, $^{237}$Np, $^{235}$U, $^{252}$Cf, AmBe etc.) which may not be detectable in spectrum 71. This corresponds to the signal processing implementation in FIG. 5 as described above.

The present invention also comprises a method for operating the nuclear spectrometer of the present invention in order to process an analog detector signal which comprises passing a gamma ray source signal through an analog detector which the converts it to an analog signal corresponding to the source gamma ray. The signal is then processed with an amplifier and the amplified signal transmitted to an analog-to-digital converter to produce a set of digital samples which are then processed through two signal-processing algorithms simultaneously with a high-gain and a low-gain algorithm that characterizes the gamma ray source signal. This is implemented by storing the high-gain signal in a high-resolution, small-energy-range spectrum of 2048 channels or less for analyzing isotopes that decay with gamma emissions of 3 MeV or lower. The low-gain signal is stored in a low-resolution, large-energy-range spectrum of up to 2048 channels for analyzing isotopes that decay with neutron emissions that generate fission gamma rays or neutron-capture gamma rays with energies from 3-10 MeV.

It is to be understood that there are numerous variations and configurations of the present invention as described and set forth above. For example, more than two signal processing pathways may be implemented and more than sets of measurements may be used in the analysis process. As another example, signal processing pathways which differ in ways other than gain or time constant may be implemented. As yet another example, the results may be collected as a spectrum from one pathway but in another way (such as a gross count, a single channel analyzer, a constant-fraction discriminator, or other processing) from the second or any subsequent pathway. Notwithstanding these various possibilities, all are considered as falling within the spirit and scope of the present invention as defined by the claims that follow.

What is claimed is:

1. A method for measuring the radioactivity of a radioactive source comprising the operation of a nuclear spectrometer wherein:
    a) gamma rays from said source are first received by a scintillation detector which converts said gamma rays to an analog detector signal corresponding to the source gamma ray;
    b) processing the analog detector signal with an amplifier;
    c) digitizing the amplified signal with an analog-to-digital converter to produce a set of digital samples;
    d) processing the digital samples through two signal-processing algorithms simultaneously;
    e) storing the two processing results in two distinct spectra, and
    f) merging the two distinct spectra in analytical processing to characterize the gamma ray source signal.

2. The method of claim 1 wherein the step of processing the digital samples through two signal-processing algorithms simultaneously is implemented with a high-gain and a low-gain algorithm.

3. The method of claim 2 wherein the processed digital samples are stored as two distinct spectra by storing the high-gain signal in a high-resolution, small-energy-range spectrum, and the low-gain signal in a low-resolution, large-energy-range spectrum.

4. The method of claim 3 wherein the small-energy-range spectrum is up to 2048 channels or less for analyzing isotopes that decay with gamma emissions of 3 MeV or lower.

5. The method of claim 4 wherein the large-energy-range spectrum is up to 2048 channels for analyzing isotopes that decay with neutron emissions that generate fission gamma rays or neutron-capture gamma rays with energies from 3-10 MeV.

6. The method of claim 1 wherein the step of processing the digital samples through two signal-processing algorithms is simultaneously implemented with a high-speed and a high-resolution algorithm.

7. The method of claim 6 wherein the processed digital samples are stored as two distinct spectra by storing the high-speed signal in a low-resolution, accurate count statistics spectrum, and the high-resolution signal in a high-resolution, low count statistics spectrum.

8. The method of claim 7 wherein the analysis uses the high-resolution spectrum for qualitative analysis of the radioisotopes present, and the low-resolution spectrum is used for quantitative analysis of the same isotopes.

9. The method of claim 1 wherein the step of processing the digital samples through two signal-processing algorithms simultaneously is implemented with an amplitude detection and a peak-shape detection algorithm.

10. The method of claim 9 wherein the processed digital samples are stored as two or more distinct spectrum histograms by storing the amplitude values into a histogram selected by the measured peak shape.

11. The method of claim 10 wherein the analysis uses one histogram to represent gamma events and another histogram to represent neutron events.

12. A nuclear spectrometer adapted for processing an analog detector signal with high dynamic range comprising:
    a) a detector that generates analog signals generated from a source of radiation emission;
    b) an amplifier that processes the analog signals to a level appropriate for digitization;
    c) an analog-to-digital converter (ADC) that converts the signals into digital signals;
    d) a digital signal processor that computes two or more different functions of the digital signals and simultaneously converts these into two or more spectra; and;
    e) a central processing unit with random access storage memory which processes the two or more spectra from the digital signal processor to provide an analytical result.

13. The spectrometer of claim 12 wherein the detector is a scintillator, consisting of one or more materials selected from the group comprising sodium iodide (NaI), cesium iodide (CsI), lanthanum chloride ($LaCl_3$), lanthanum bromide ($LaBr_3$), cerium bromide ($CeBr_3$), and Lithium Iodide (LiI).

14. The spectrometer of claim 13 wherein the two different functions of the digital signals are a low-gain, high-resolution, and a high-gain, low-resolution amplitude measurement.

15. The spectrometer of claim 14 wherein the detector further is assembled with a adjacent moderator material selected from the group consisting of graphite, pyrolytic carbon, high-density polyethylene (HDPE), paraffin, water, or beryllium (Be).

16. The spectrometer of claim 15 wherein the detector further is assembled with an adjacent material containing elements selected from the group consisting of boron (B), lithium (Li), chlorine (Cl), manganese (Mn), iron (Fe), and nitrogen (N).

17. The spectrometer of claim 16 wherein the digital signal processing unit is implemented with a logic configuration in a field-programmable gate array (FPGA) comprising two or more processing elements that convert the digital signals using signal-processing algorithms simultaneously.

18. The spectrometer of claim 16 wherein the digital signal processing unit is implemented with an application-specific integrated circuit (ASIC) in a single integrated circuit (IC) package comprising two or more processing elements that convert the digital signals using signal-processing algorithms simultaneously.

19. The spectrometer of claim 16 wherein the digital signal processing unit is implemented with commercial single-chip digital signal processor (CDSP) implementing two or more simultaneous signal-processing algorithms that transform the digital signals.

20. The spectrometer of claim 16 wherein the digital signals are converted to pulse height spectra through two signal-processing algorithms simultaneously.

21. The spectrometer of claim 20 wherein the processing of the pulse height spectra identifies the isotopes generated by the radioactive source by their characteristic emissions.

22. A nuclear spectrometer adapted for processing an analog detector signal with high dynamic range comprising:
  a) a detector that generates analog signals generated from a source of radiation emission;
  b) an amplifier that processes the analog signals to a level appropriate for digitization;
  c) an analog-to-digital converter (ADC) that converts the signals into digital signals;
  d) a digital signal processor that computes two or more different functions of the digital signals and converts these into two or more spectra;
  e) a central processing unit with random access storage memory which processes spectra from the digital signal processor to provide an analytical result;
  wherein the digital signal processor additionally converts the two or more spectra to a single spectrum that has different bin widths as a function of energy, with high resolution in some portions of the spectrum and low resolution in other portions of the spectrum.

23. The spectrometer of claim 22, wherein the analytical processing comprises a library of isotopes specifically adapted to the resolution of the spectrum, and suitable firmware for matching the spectrum to this library.

24. The nuclear spectrometer of claim 23 wherein the library consists of descriptions of isotopes in terms of their spectral line energies and intensities.

25. The spectrometer of claim 24 wherein the isotope descriptions in the library comprise template spectra created from one or more isotopes, which are matched, singly or in combination, to the overall spectrum generated by the radioactive emission, using a template matching technique selected from the group comprising cross-correlation analysis, neural-networks, and machine-learning techniques.

26. A nuclear spectrometer adapted for processing an analog detector signal with high dynamic range comprising:
  a) a detector that generates analog signals generated from a source of radiation emission;
  b) an amplifier that processes the analog signals to a level appropriate for digitization;
  c) an analog-to-digital converter (ADC) that converts the signals into digital signals;
  d) a digital signal processor that computes two or more different functions of the digital signals and converts these into two or more spectra;
  e) a central processing unit with random access storage memory for these spectra, which are processed to provide an analytical result, the processing comprising individually matching the spectra to distinct libraries matched to the characteristics of those spectra.

27. The spectrometer of claim 26, wherein the analytical processing comprises a library of isotopes specifically adapted to a low energy (0-3 MeV) gamma spectrum, and a separate library specifically adapted to a high energy (0-8 MeV) neutron capture spectrum, with suitable firmware for matching the spectra to their corresponding libraries.

28. The spectrometer of claim 27 wherein the low energy library consists of descriptions of isotopes in terms of their spectral line energies and intensities, and wherein the high energy library consists of spectral thumbprints for the associated neutron capture materials.

29. The spectrometer of claim 27 wherein the isotope descriptions in the libraries comprise template spectra created from one or more isotopes, which are matched, singly or in combination, to the overall spectrum generated by the radioactive emission, using a template matching technique selected from the group comprising cross-correlation analysis, neural-networks, and machine-learning techniques.

30. The spectrometer of claim 29 wherein the scintillator further consists of dopants selected from the group consisting of thallium (Tl) and europium (Eu) and mixtures thereof.

* * * * *